Jan. 1, 1924

M. THIERY

SAFETY DEVICE

Filed Jan. 17, 1923

INVENTOR
MICHAEL THIERY

By Frank L. Zugelter
ATTORNEY

Jan. 1, 1924
M. THIERY
SAFETY DEVICE
Filed Jan. 17, 1923
1,479,115
2 Sheets-Sheet 2
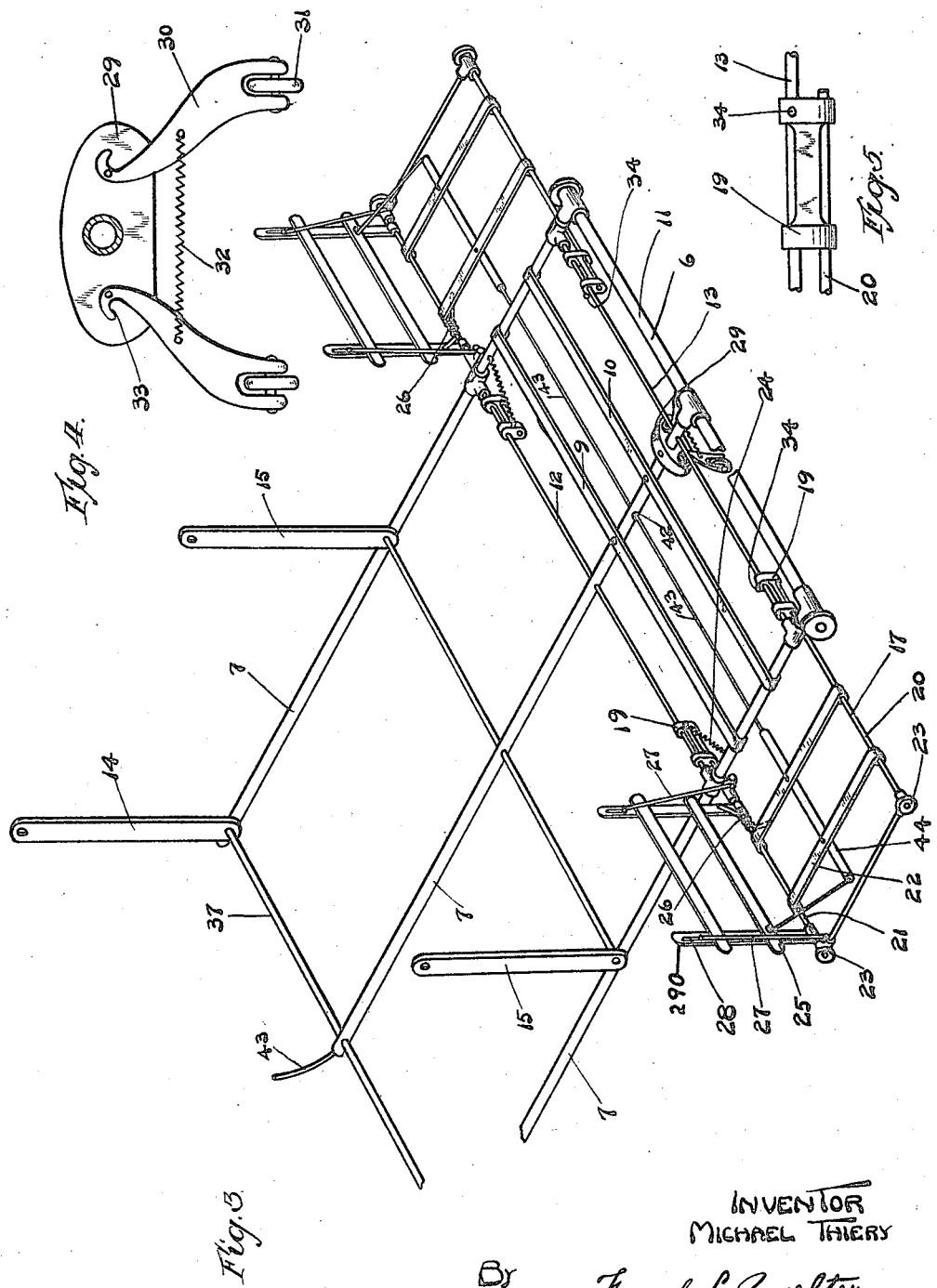
INVENTOR
MICHAEL THIERY
By Frank L. Gugelter
ATTORNEY Patented Jan. 1, 1924.

1,479,115

UNITED STATES PATENT OFFICE.

MICHAEL THIERY, OF CINCINNATI, OHIO.

SAFETY DEVICE.

Application filed January 17, 1923. Serial No. 613,295.

*To all whom it may concern:*

Be it known that I, MICHAEL THIERY, a citizen of the United States, residing at Cincinnati, in the county of Hamilton and State of Ohio, have invented a new and useful Improvement in Safety Devices, of which the following is a specification.

My invention is concerned with safety devices of the nature disclosed in my United States Letters Patent for a safety device for automobiles, dated August 30, 1921, Number 1,388,891.

An object of my invention is to provide means for protecting from the vehicle wheels, any foreign objects struck by a vehicle.

Another object is to provide a device for the object stated, that may be caused to assume a normal compact form and a normal position out of sight below the vehicle and which will assume a position to the front of the vehicle, adjacent the roadway, upon striking a foreign object.

Another object is to provide a simple and efficient device for the purposes stated.

These and other objects are attained by the means described herein and disclosed in the accompanying drawings in which;

Fig. 3 is perspective view of device embodying my invention.

Fig. 4 is an enlarged detail view of a release device forming a detail of my invention.

Fig. 5 is an enlarged detail view of a slide block forming a detail of my invention.

Figures 1, 2:
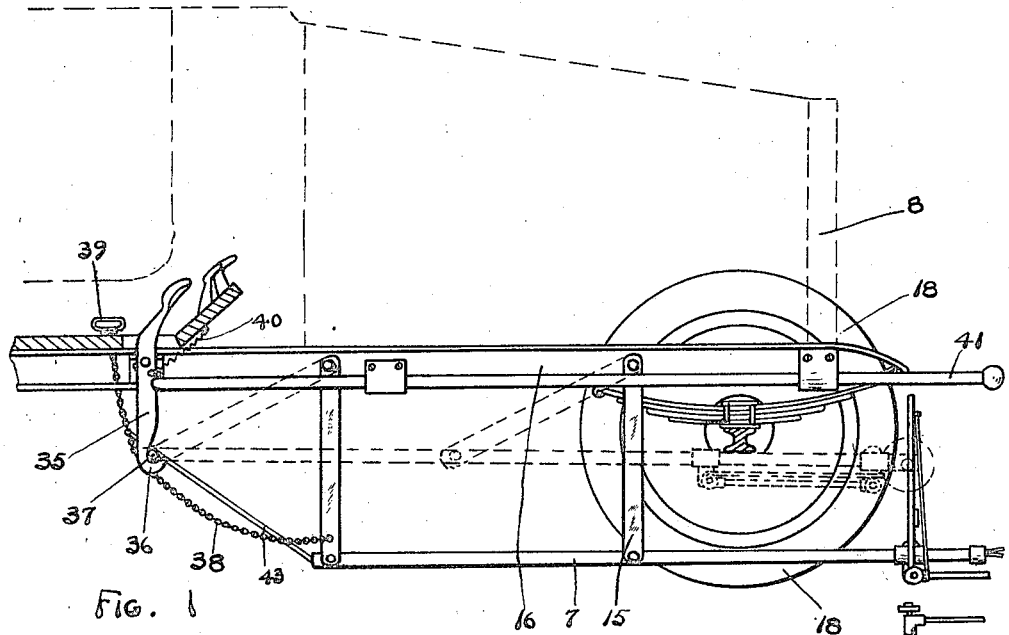
Fig. 1 is a side elevation of a device embodying my invention.
Fig. 2 is an inverted plan view of a device embodying my invention, and mounted on an automobile.

A main fender 6 comprises the bars 7 adapted to extend longitudinally of the vehicle 8 to which the device is applied. The forward ends of the bars 7 are connected by cross bars 9, 10, and 11, and guide rods 12 and 13. The fender is suspended from the frame of the vehicle by a pair of links 14 pivoted at the rear end of the fender, and a pair of links 15 pivotally supporting the fender intermediate its forward and rear ends. All the links are pivotally mounted on the frame 16 of the vehicle. The forward end of the fender carries wheels for engagement upon the roadway. The guide rods carry auxiliary side fenders 17 that may slide to contracted or extended positions. In the contracted position of the auxiliary fenders, said fenders are contained within the lateral limits of the main fender to permit movement of the fenders upwardly and rearwardly between the wheels 18 of the vehicle. In the extended position of the fenders 17, said fenders lie in front of and to both sides of the wheels 18. Fenders 17 are mounted on slide blocks 19 and comprise forward and rear transverse rods 20 and 21 respectively, between which rods 20 and 21 extend straps or rods 22. The outer or side edges of the fenders 17 carry rollers or wheels 23. The slide blocks are reciprocally mounted on the guide rods 12 and 13. Springs 24 yieldingly retain the auxiliary fenders in extended position, and are mounted on the guide blocks and the main fender. Each auxiliary fender has mounted on its rear transverse rod 21, a supplemental fender 25. The supplemental fenders are pivotally mounted on rods 21 and are adapted to lie upon the auxiliary fenders when the device is in a contracted form. The guide blocks so space the main and auxiliary fenders that the supplemental fenders may lie between them. Springs 26 mounted on the rods 21 yieldingly resist movement of the supplemental fenders to a contracted position, and stop bars 27, pivotally mounted on the auxiliary fenders and slidably engaging in the slots 28 in the side bars 290 of the supplemental fenders, limit the movement of the supplemental fenders about their pivotal mountings. A trip or release device is mounted on the main fender for retaining the fender in a contracted position and for releasing the fenders 17 and 25 when the main fender is moved adjacent the roadway. The trip device comprises a plate 29 having pivotally mounted on it catches 30. The catches carry at their free ends, rollers 31 adapted to engage a roadway and to be thereby moved against the yielding resistance of the spring 32, which spring normally retains the hooked ends 33 of the catches in engagement upon the pins 34 carried by the forward pair of slide blocks. A foot lever 35 is pivotally mounted on the vehicle floor and has a hooked lower end 36 adapted to receive the rear cross bar 37 of the main fender to retain the fender in an elevated and inoperative position. The fender may be moved to this position by any suitable means such as the chain 38 having a handle 39 disposed upon the upper surface of the vehicle floor. A spring 40 extending between the foot lever and the floor yieldingly resists movement of the lever about its pivotal mounting. A bumper 41, reciprocable longitudinally of the vehicle, as also disclosed in my referred to patent, is adapted to move the lever against the action of the spring 40 upon engagement of the bumper and a foreign object. The lever may also be tripped by means of the upper end of the lever that extends thru the floor. The center bar is preferably hollow and has openings 42 at diametrically opposed places, near its forward end, thru which openings a cable 43 extends. The rear end of the cable is connected to chain 38 and the forward portion of the cable extends transversely of the main fender, thru a guide tube 44 carried by the auxiliary fender and is attached at its end upon the supplemental fender, preferably adjacent the outer edge of the supplemental fender. Enough slack is provided in the chain so that in taking up this slack preparatory to returning the fenders to their contracted or inoperative position, the supplemental fender will be moved into a contracted position upon the auxiliary fender, and the supplemental and auxiliary fender be moved to a contracted position upon the main fender. In moving the auxiliary and supplemental fenders to the last mentioned position, the pins 34 on the slide blocks 19 will be moved centerward of the main frame beyond the hooks 33, so that when the main fender is moved toward its contracted position, the spring 32 will move the catches to positions such that the catches will secure the pins 34 when the chain is released after lodging the cross bar 37 in the hooked lower end 36 of the foot lever 35.

In the operation of my device, when the fender is released from the lever, gravity will move the fender downwardly and when the rollers 31 of the trip device engage the roadway, the auxiliary fenders are released and springs 24 slide the auxiliary fenders laterally, thereby releasing the supplemental fenders from between the other two fenders, whereupon the springs 26 move the supplemental fenders to an extended position. The cycle of returning the fender to an inoperative position is the reverse to the procedure just described.

What I claim is:

1. In a device of the class described the combination with a main fender of an auxiliary fender and a supplemental fender contractible within the body line of the main fender, and means for extending the auxiliary and supplemental fenders beyond the body line of the main fender.

2. In a device of the class described the combination with a main fender of an auxiliary fender and a supplemental fender contractible within the body line of the main fender, means for moving the auxiliary and supplemental fenders beyond the body line of the main fender, and means for extending the supplemental fender at an angle to the auxiliary fender.

3. The combination with a main fender of means for mounting the fender upon a vehicle, means for releasably retaining the main fender in an inoperative position, means for releasing the fender for movement to an operative position, an extensible auxiliary fender carried by the main fender in a normally contracted position, and means for extending the auxiliary fender simultaneously with the movement of the main fender to an operative position.

4. The combination with a main fender of means for mounting the fender upon a vehicle, means for releasably retaining the main fender in an inoperative position, means for releasing the fender for movement to an operative position, an extensible auxiliary fender and an extensible supplemental fender carried by the main fender in a normally contracted position, and means for extending the auxiliary and supplemental fenders simultaneously with the movement of the main fender to an operative position.

5. In a device of the class described the combination of a vehicle having a pair of front wheels, a main fender comprising connected bars extending longitudinally of the vehicle, a pair of links pivotally mounted on the vehicle and upon the rear end of the bars, a second pair of links pivotally mounted on the vehicle and the bars intermediate the ends of the bars, means on the vehicle for retaining the fender in a normal elevated position adjacent the vehicle, and means for releasing the fender whereby the fender may move upon its pivotal mountings for spacing the fender from the vehicle and disposing the fender adjacent a roadway for the reception of foreign objects in the path of the vehicle.

6. In a device of the class described the combination of a vehicle having a pair of front wheels, a main fender comprising connected bars extending longitudinally of the vehicle, a pair of links pivotally mounted on the vehicle and upon the rear end of the bars, a second pair of links pivotally mounted on the vehicle and the bars intermediate the ends of the bars, means on the vehicle for retaining the fender in a normal elevated position adjacent the vehicle, means for releasing the fender whereby the fender and links may move upon their pivotal mountings for spacing the fender from the vehicle and disposing the fender adjacent a roadway for the reception of foreign objects in the path of the vehicle, an auxiliary fender carried by the first mentioned fender mounted on the first mentioned fender for lateral extension, and means for normally retaining the auxiliary fender in a contracted position and for releasing the auxiliary fender upon movement of the first mentioned fender adjacent the roadway.

7. In a device of the class described the combination of a vehicle having a pair of front wheels, a main fender comprising connected bars extending longitudinally of the vehicle, a pair of links pivotally mounted on the vehicle and upon the rear end of the bars, a second pair of links pivotally mounted on the vehicle and the bars intermediate the ends of the bars, means on the vehicle for retaining the fender in a normal elevated position adjacent the vehicle, means for releasing the fender whereby the fender and links may move upon their pivotal mountings for spacing the fender from the vehicle and disposing the fender adjacent a roadway for the reception of foreign objects in the path of the vehicle, an auxiliary fender carried by the first mentioned fender mounted on the first mentioned fender for lateral extension, means for normally retaining the auxiliary fender in a contracted position and for releasing the auxiliary fender upon movement of the first mentioned fender adjacent the roadway, and means for returning both fenders to their normal positions.

8. In a device of the class described the combination of a vehicle having a pair of front wheels, a main fender comprising connected bars extending longitudinally of the vehicle, a pair of links pivotally mounted on the vehicle and upon the rear end of the bars, a second pair of links pivotally mounted on the vehicle and the bars intermediate the ends of the bars, means on the vehicle for retaining the fender in a normal elevated position adjacent the vehicle, means for releasing the fender whereby the fender and links may move upon their pivotal mountings for spacing the fender from the vehicle and disposing the fender adjacent a roadway for the reception of foreign objects in the path of the vehicle, an auxiliary fender carried by the first mentioned fender mounted on the first mentioned fender for lateral extension, means for normally retaining the auxiliary fender in a contracted position and for releasing the auxiliary fender upon movement of the first mentioned fender adjacent the roadway, and a supplemental fender carried by the auxiliary fender for extension from the auxiliary fender upward in front of the wheels, simultaneously with the extension of the auxiliary fender.

9. In a device of the class described the combination of a vehicle having a pair of front wheels, a main fender comprising connected bars extending longitudinally of the vehicle, a pair of links pivotally mounted on the vehicle and upon the rear end of the bars, a second pair of links pivotally mounted on the vehicle and the bars intermediate the ends of the bars, means on the vehicle for retaining the fender in a normal elevated position adjacent the vehicle, means for releasing the fender whereby the fender and links may move upon their pivotal mountings for spacing the fender from the vehicle and disposition of the fender adjacent a roadway for the reception of foreign objects in the path of the vehicle, an auxiliary fender carried by the first mentioned fender mounted on the first mentioned fender for lateral extension, means for normally retaining the auxiliary fender in a contracted position and for releasing the auxiliary fender upon movement of the first mentioned fender adjacent the roadway, a supplemental fender carried by the auxiliary fender for extension from the auxiliary fender upward in front of the wheels, simultaneously with the extension of the auxiliary fender, and means for contracting all the fenders and returning the fenders to their normal positions.

10. The combination with a vehicle of a main fender mounted on the vehicle for assuming a position in immediate proximity to a roadway and a position spaced from the roadway, a laterally extensible auxiliary fender carried by the main fender, and means operable from the vehicle controlling movement of the auxiliary fender to an extended and a contracted position and for moving the main fender to either of its positions.

11. The combination with a vehicle of a main fender mounted on the vehicle for movement to a position in immediate proximity to a roadway and a position spaced from the roadway, of an auxiliary fender slidably mounted on the main fender for extension laterally of the main fender, yielding means for extending the auxiliary fender, and means for retaining the auxiliary fender in a contracted position in the second mentioned position of the main fender and for releasing the auxiliary fender on movement of the main fender to its first mentioned position.

12. The combination with a vehicle of a main fender mounted on the vehicle for movement to a position in immediate proximity to a roadway and a position spaced from the roadway, of an auxiliary fender slidably mounted on the main fender for extension laterally of the main fender, yielding means for extending the auxiliary fender, means for retaining the auxiliary fender in a contracted position in the second mentioned position of the main fender and for releasing the auxiliary fender on movement of the main fender to its first mentioned position, and means operable from the vehicle for moving the fenders to any of their positions.

13. The combination with a vehicle of a main fender mounted on the vehicle for movement to a position in immediate proximity to a roadway and a position spaced from the roadway, of an auxiliary fender slidably mounted on the main fender for extension laterally of the main fender, yielding means for extending the auxiliary fender, means for retaining the auxiliary fender in a contracted position in the second mentioned position of the main fender and for releasing the auxiliary fender on movement of the main fender to its first mentioned position, means operable from the vehicle for moving the fenders to any of their positions, and a bumper carried by the vehicle for controlling movement of the fenders to the first mentioned position upon striking a foreign object.

14. The combination with a vehicle of a main fender mounted on the vehicle for movement to a position in immediate proximity to a roadway and a position spaced from the roadway, of an auxiliary fender slidably mounted on the main fender for extension laterally of the main fender, yielding means for extending the auxiliary fender, means for retaining the auxiliary fender in a contracted position in the second mentioned position of the main fender and for releasing the auxiliary fender on movement of the main fender to its first mentioned position, and a supplemental fender mounted on the auxiliary fender for extension from the auxiliary fender substantially perpendicular to the roadway in the first mentioned position of the main fender and adapted to assume a contracted position in substantial parallelism with and between the main and auxiliary fenders in the second mentioned position of the main fender.

15. The combination with a vehicle of a main fender mounted on the vehicle for movement to a position in immediate proximity to a roadway and a position spaced from the roadway, of an auxiliary fender slidably mounted on the main fender for extension laterally of the main fender, yielding means for extending the auxiliary fender, means for retaining the auxiliary fender in a contracted position in the second mentioned position of the main fender and for releasing the auxiliary fender on movement of the main fender to its first mentioned position, a supplemental fender mounted on the auxiliary fender for extension from the auxiliary fender substantially perpendicular to the roadway in the first mentioned position of the main fender and adapted to assume a contracted position in substantial parallelism with and between the main and auxiliary fenders in the second mentioned position of the main fender, and means operable from the vehicle for moving the fenders to any of their positions.

16. The combination with a vehicle of a main fender mounted on the vehicle for movement to a position in immediate proximity to a roadway and a position spaced from the roadway, of an auxiliary fender slidably mounted on the main fender for extension laterally of the main fender, yielding means for extending the auxiliary fender, means for retaining the auxiliary fender in a contracted position in the second mentioned position of the main fender and for releasing the auxiliary fender on movement of the main fender to its first mentioned position, a supplemental fender mounted on the auxiliary fender for extension from the auxiliary fender substantially perpendicular to the roadway in the first mentioned position of the main fender and adapted to assume a contracted position in substantial parallelism with and between the main and auxiliary fenders in the second mentioned position of the main fender, means operable from the vehicle for moving the fenders to any of their positions, and a bumper carried by the vehicle for controlling movement of the fenders to the first mentioned position upon striking a foreign object.

In testimony whereof, I have hereunto subscribed my name this 2nd day of January, 1923.

MICHAEL THIERY.